C. M. WHITEHEAD.
SKID CHAIN FASTENER.
APPLICATION FILED MAR. 8, 1920.

1,373,281.

Patented Mar. 29, 1921.

Inventor
C. M. Whitehead.

By Geo. P. Kimmel.
Attorney

UNITED STATES PATENT OFFICE.

CHARLES M. WHITEHEAD, OF SPOKANE, WASHINGTON.

SKID-CHAIN FASTENER.

1,373,281.　　　　　Specification of Letters Patent.　　Patented Mar. 29, 1921.

Application filed March 8, 1920. Serial No. 364,077.

*To all whom it may concern:*

Be it known that I, CHARLES M. WHITEHEAD, a citizen of the United States, residing at Spokane, in the county of Spokane and State of Washington, have invented certain new and useful Improvements in Skid-Chain Fasteners, of which the following is a specification.

The invention relates to a link chain fastener, and more particularly to the class of anti-skid chain coupling links or fasteners.

The primary object of the invention is the provision of a fastener of this character, wherein the terminal links of an anti-skid chain can be conveniently and easily fastened together for the securing of the skid chain about the tire on an automobile wheel, the fastener being of novel form, so that on opening the coupling members to one end thereof for the engagement of one terminal link therein the other members at the other end of the fastener will not be disturbed, thereby enabling the quick and easy engagement of the fastener to both ends of the skid chain, for the securing of said chain upon the tire for use.

Another object of the invention is the provision of a fastener of this character wherein the terminal link engaging members are assembled in a unique manner so that said members can be independently operated for the opening of the ends of the fastener to permit the introduction of the terminal links of an anti-skid chain therein or the removal of said terminal links, for expediting the fastening of the anti-skid chain upon a tire when carried by a wheel or the removal of said chain from the tire.

A further object of the invention is the provision of a fastener of this character wherein the link engaging members, when closed with the terminal links of an anti-skid chain engaged therein, will be prevented from the accidental opening of the members and thereby freeing the terminal links, thus assuring a positive and safe fastener for the ends of the anti-skid chain.

A further object of the invention is the provision of a fastener of this character, which is extremely simple in construction, readily and easily operated, strong, durable, capable of being applied for the fastening of the ends of a skid chain with dispatch and likewise assuring the quick and easy removal of the fastener and the detachment of the ends of the skid chain when the occasion requires, and inexpensive of manufacture.

With these and other objects in view, the invention consists in the features of construction, combination and arrangement of parts, as will be hereinafter fully described, illustrated in the accompanying drawings and pointed out in the claims hereto appended.

In the accompanying drawing.

Similar reference characters indicate corresponding parts throughout the several views in the drawing.

Figure 1:
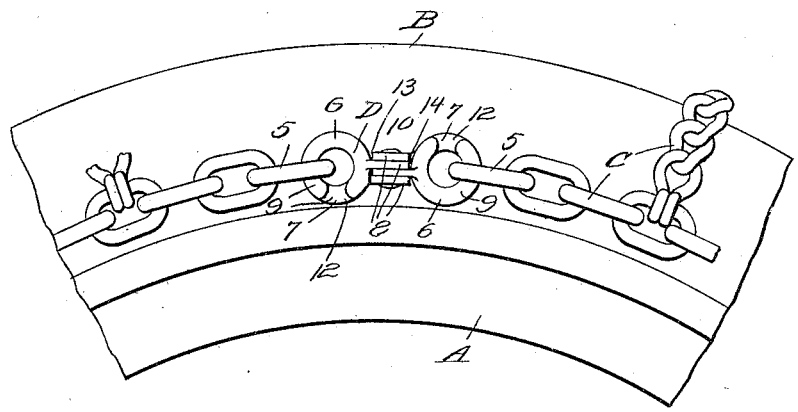
Figure 1, is a fragmentary side elevation of a portion of an automobile wheel carrying a tire and a skid chain showing the fastener constructed in accordance with the invention applied.
Figure 2:
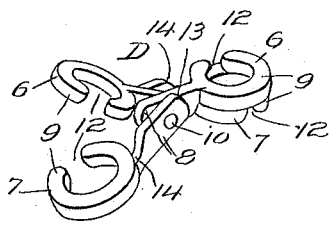
Fig. 2, is a perspective view of the fastener detached showing one pair of the coupling members thereof opened for the insertion of the terminal link of a skid chain, the other pair of said coupling members being closed.
Figure 3:
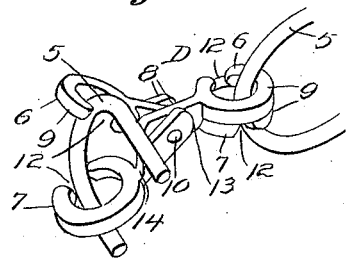
Fig. 3, is a view similar to Fig. 2, showing the terminal link of the skid chain in position engaged in one of the pairs of coupling members and the other coupling member about to be closed, the other pair of coupling members being closed and another terminal link engaged therein.

Referring to the drawing in detail, A designates generally a portion of an automobile wheel, carrying thereon the usual shoe or case B of a pneumatic tire, which may be of any ordinary well-known construction, while in a position upon said shoe or case B is an anti-skid chain C of any approved type, only the end portions of said chain being shown in Fig. 1 of the drawing. And adapted to be detachably engaged with the terminal links 5 of these end portions of said skid chain C at each side of the shoe or casing is the fastener D, the details of which will be hereinafter fully described.

The fastener D comprises opposite pairs of coupling members 6 and 7 respectively, each being formed with a flat relatively narrow shank portion 8 and a substantially C-shaped head 9 forming a coupling jaw, the shanks 8 of said members being arranged side by side and having passed transversely therethrough medially of the same a pivot 10, which swingingly connects the members 6 and 7 together in an assembled relation to each other so that one member can be moved independently of any of the other members, as will be clearly apparent.

The head 9 of each member is flat and disposed in a plane at right angles to the plane of the shank 8 so that the members 6 and 7 when brought together will lie one upon the other, the heads 9 of the coupling members 6 and 7 being reversed relative to each other so that when the members are brought together the open sides by reason of the particular formation and assemblage of said heads will be caused to positively retain the terminal links 5 of the chain ends C in the fastener D. On the spreading apart of the coupling members 6 and 7 the open sides of the heads 9 will permit the free introduction of a terminal link 5 through said open side of each member into the same and when the members are brought together the open sides thereof are closed, thereby holding the terminal link 5 engaged in the heads 9, when brought together.

Each side opening 12 in the head 9 forms an entrance thereto for the insertion of the terminal link within the head to be engaged thereby and on bringing together of the pair of opposed members 6 and 7, the said link will be prevented from disengagement as the open sides 12 will be closed due to the reversed position of said heads 9 which, when brought together the solid side of one closes the open side of the other as will be obvious.

The shanks 8, of the members 6 and 7, are rounded as at 13 at their ends and also cut away at 14 adjacent to the heads 9 so that no interference will be had in the spreading apart or bringing together of the heads when the fastener is manipulated for the application thereof to the terminal links 5 of the chain C or the removal of the fastener therefrom. The cut away portions 14 permit the bringing together of the heads 9 one upon the other when the terminal links are engaged in the heads 9 of said members, it being evident that the pivot 10 allows the pairs of members 6 and 7 to swing relative to each other when brought together and thus affording the flexing action which may be necessary in the fastening of the skid chain upon the shoe B and overcoming undue breaking strain upon these members, when brought together, which might be the case should the same be rigid in assembled crossed pivoted relation to each other.

It will be clearly apparent that either pair of jaws 9 can be spread apart or brought together without disturbing the other pair of jaws, which renders the fastener convenient for engagement with the terminal link 5, or its disengagement therefrom with despatch.

In the use of the fastener D when it is desired to engage the same with the terminal link 5 the jaws 9 of one pair are spread apart and the terminal link is inserted through the open side of one jaw and thereafter turned on itself to assume a position at right angles to the plane of the jaw 9 initially receiving the same and in this position the other jaw of said pair can be closed or brought in superimposed position upon the jaw initially receiving the link and in this manner the link will become engaged in the closed jaws without any possibility of the accidental detachment until said jaws are again spread apart and the link properly manipulated for its removal from the jaws. There is no possibility of the links becoming separated from the fastener when the pairs of jaws are brought together and the said links engaged therein.

From the foregoing it is thought that the construction and the manner of use of the fastener D with the members 6 and 7 constructed, arranged and operated in the manner hereinbefore set forth will be clearly obvious and therefore a more extended explanation has been omitted.

I claim:

1. A fastener of the character described comprising opposed pairs of swingingly connected independently movable members, each pair being in the form of reversely disposed substantially C-shaped jaws, so that on the bringing together of the pair, the same will be closed for retaining the link of a chain engaged therein.

2. In a fastener of the character described, oppositely disposed pairs of swingingly connected link engaging members, the members of each pair having side openings in opposite sides thereof and closed by the respective members of said pair on the bringing together of the same, the members being independently movable relative to one another, whereby a pair of said members can be spread apart without disturbing the other pair of said members.

In testimony whereof, I affix my signature hereto.

CHARLES M. WHITEHEAD.